Nov. 8, 1955    J. E. MOXON    2,723,104
MINE JACK
Filed April 16, 1953
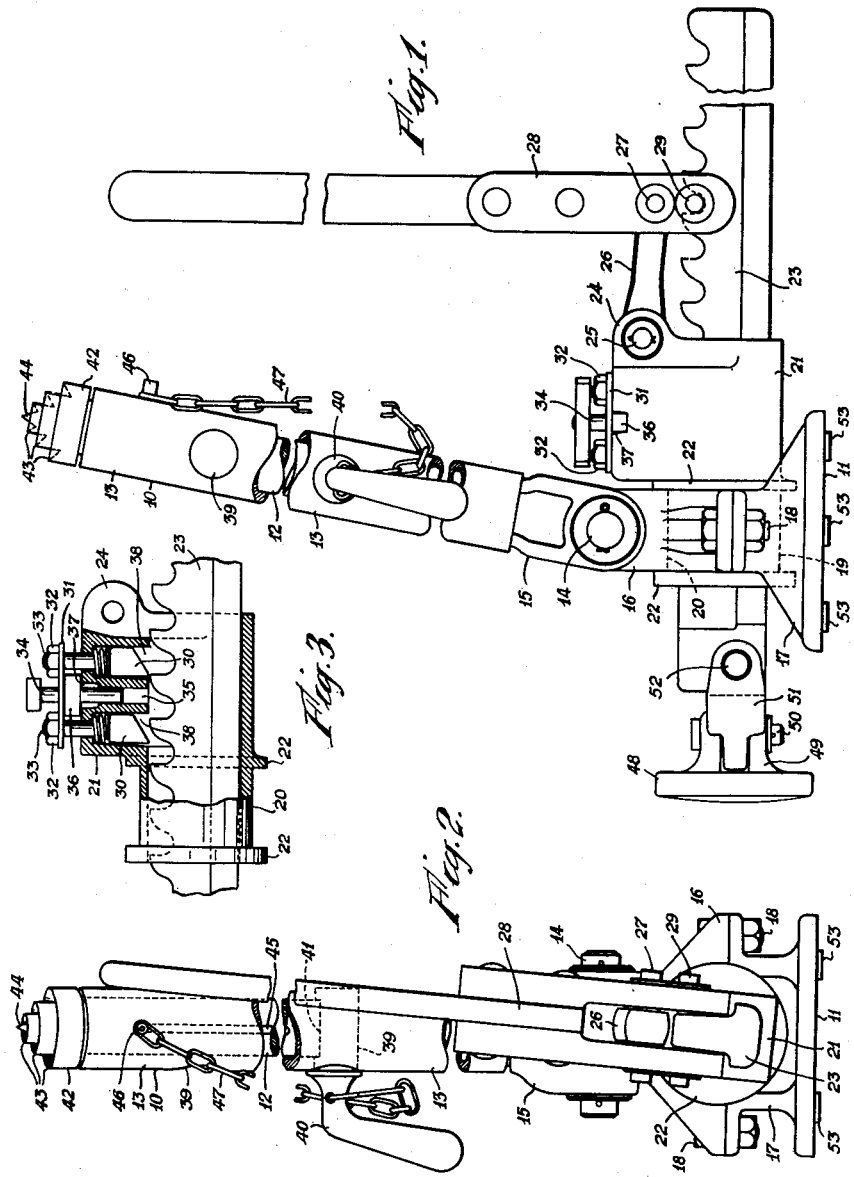
Inventor
James Edgar Moxon
by Albert J. Jacobs
Attorney

United States Patent Office 2,723,104
Patented Nov. 8, 1955

2,723,104

MINE JACK

James Edgar Moxon, Sheffield, England, assignor of one-half to George Moxon (Mining) Limited, Sheffield, England, a corporation of Great Britain and Northern Ireland Application April 16, 1953, Serial No. 349,259

Claims priority, application Great Britain June 16, 1952

7 Claims. (Cl. 254—112)

This invention relates to a jack device, more particularly for use in underground mines, the invention being applicable to such devices which are employed for assisting in the movement, from one position to another, of heavy mining machinery and equipment.

An object of this invention is to provide a jack device in which a telescopically adjustable post adapted to be wedged at its opposite ends against opposing surfaces is provided with means mounting a lever actuated rack and ratchet device on a non-extendible length of the post for swivelable movement about an axis normal to said non-extendible length of the post, said rack being slidable in the direction of said axis into pushing engagement with an extraneous object.

A further object of the invention is to provide the post with a bearing, having its axis transversely of the post, for swivelably accommodating the means for mounting the rack and ratchet device on the post.

A still further object is to provide that the bearing on the post is formed at the meeting ends of adjoining lengths of the post which are detachably connected together to permit easy assembly in the bearing of the means swivelably mounting the rack and ratchet device on the post.

A still further object is to provide a pivotal connection of one length of the post with another length thereof to facilitate fixing of the post in position.

A still further object is to provide ratchet means for the rack which will operate to prevent a minimum of retracting movement thereof under opposing thrust of the object to be pushed by the rack.

It is also a further object to provide for the ratchet means to be releasable from positive engagement with the rack to permit desired retracted movement thereof.

A still further object is to provide means on the telescopic length of the post for locking the telescoping members of said length against relative movement under and thrust upon the post by the opposing surfaces between which said post is wedged.

These and other objects will be apparent from the following description in which reference is had to the accompanying drawings.

In the drawings:

Fig. 1 is a side elevation of one form of jack device made in accordance with the invention.

Fig. 2 is a rear end elevation.

Fig. 3 is a detail sectional view of the rack-accommodating and supporting member showing the ratchet means released from engagement with the rack.

The jack illustrated comprises a post composed of an upper section 10 and a lower section or foot 11, the upper section 10 consisting of a pair of inner and outer telescoping members 12 and 13 respectively.

The upper end of the foot 11 supports a pivot pin 14 by which the upper section 10 of the post is pivoted to the foot thereof, the lower end of the upper post section being forked as seen at 15 to embrace the upper end of the foot and the ends of the pivot pin 14.

The foot 11 is formed in two parts, an upper part 16 and a lower part 17 which are detachably secured together by bolts 18 and provide a bearing 19 of which the axis is disposed normal to the vertical axis of the foot.

Journalled in the bearing 19 is a hollow shaft 20 fixedly provided on the forward end of a rack-accommodating and supporting member 21, flanges 22 at opposite ends of the shaft 20 serving to retain said shaft against axial displacement in the bearing.

The rack-accommodating and supporting member 21 conforms substantially to a box-like casing having an open rear end and slidably accommodating a rack 23 which extends through the hollow shaft 20 and bearing 19 axially thereof.

The open rear end of the member 21 is provided at its upper corners with a pair of co-axial eye-lugs 24 carrying a pivot pin 25 to which is anchored a link 26, the other end of said link being connected to a fulcrum pin 27 which is carried in the forked end of a hand lever 28, said forked end of the hand lever also carrying a rack engaging pin 29.

Depending through the upper wall of the rack-accommodating and supporting member 21 for engagement with and disengagement from the teeth of the rack 23 is a pair of spring-pressed pawls 30 which are adjustably carried by a plate 31 by means of adjusting nuts 32 which engage screw-threaded stems 33 of the pawls 30.

The plate 31 is slidably accommodated on a manipulable headed carrying spindle 34 which slidably and rotatably engages a hollow boss 35 depending from the upper wall of the member 21 interiorly thereof.

Fixedly on the spindle 34 immediately under the pawl-carrying plate 31 is a latch 36 which is adapted to seat in an oblong shaped opening 37 in the upper end of the hollow boss 35 and upper wall of the rack-accommodating and supporting member 21 or to lie across and out of seating engagement with said opening 37.

As seen in Fig. 3, the latch 36 is shown out of seating engagement with the opening 37 by reason of the spindle 34 having been upwardly withdrawn sufficiently and rotated through 90°, the result being that the pawls 30 are held in a retracted position. It will be obvious, therefore, that by again rotating the spindle 34 through 90°, the latch will register with the opening 37 and owing to the action of the springs of the pawls 30, the whole assembly will fall and the latch 36 come into seating engagement with the opening 37 and the plate 31 will rest upon the wall of the member 21 whereupon the pawls will be in position ready for engagement with the teeth of the rack 23.

The boss 35 and the end walls of the member 21 cooperate to provide guides 38 for the pawls.

It will be seen from Fig. 3 that the pawls 30 and their guides 38 are spaced apart a distance a little greater than the pitch of the teeth of the rack. This arrangement provides that one or other of the pawls will operatively engage a tooth of the rack and arrest the rack over a minimum of retracted movement thereof.

The outer telescoping member 13 is provided at longitudinally spaced intervals with co-axial pairs of pin-receiving holes 39, a pin 40 being adapted, on insertion in one pair of co-axial holes 39, to support the inner telescoping member 12 which rests by its lower end upon the pin 40, said pin being formed with a flat seating face 41 for the end of said inner telescoping member 12.

The upper end of the inner telescoping member is enlarged by the provision of a flange 42 and is machined into an irregular stepped formation providing a plurality of circumferential knife edges 43, and central protruding spike 44 spaced non-equidistantly one above another.

To prevent complete withdrawal of the inner telescoping member 12 said member is provided with a longitudinal groove 45 closed at its lower end and engaged by the inner end of a stud 46 fitted in the outer telescoping member 13.

The stud 46 also serves for the attachment thereto of a short length of chain 47 to which the pin 40 is attached to prevent its becoming lost when the jack is not in use.

As will be seen in Fig. 1, the rack 23 is provided at its front end with a pusher head 48 having a bifurcated rearward extension 49 straddling, and secured by a vertical pivot pin 50 to, the reduced front end of a carrier block 51, said carrier block being bifurcated at its rear end and straddling the front end of the rack 23 to which said carrier block is pivotally connected by a horizontal pivot pin 52. The pusher head 48 is, therefore, connected to the rack 23 so as to be capable of swivelling movement to a small extent.

The foot 11 of the post is provided with depending projections 53 for biting into the surface with which it is adapted to engage.

In use, the post of the jack is placed with its lower section or foot 11 resting on the ground of a mine roadway and the upper section 10 with the spiked and knife-edged upper end of the inner telescoping member 12 engaging the roof, said inner telescoping member being adjusted for the purpose according to the height of the roof from the ground and said upper section 10 being tilted rearwardly a few degrees from verticality about the pivot 14 so that the post is held between the roof and ground.

It will, of course, be understood that the jack is positioned as immediately before stated so that the head 48 is in close adjacency with a substantially vertical face of a machine or other object desired to be pushed along the ground, the rack 23 being in the fully retracted position.

The pawls 30 are set in position for engagement with the rack 23 and the hand lever 28 is positioned so that its pin 29 is in engagement with a tooth of the rack as seen in Fig. 1 and by manipulating the hand lever downwards rearwardly about its fulcrum 27, the rack is moved forwards so that a force is applied by the head 48 to the machine or other object sufficient to move it forward. The resultant rearward thrust upon the rack is transmitted to the foot 11 of the post which will, in consequence, move said foot rearwardly to a small extent relatively to the upper section 10 of the post, thereby tending to straighten the post and wedge it tightly in position. Immediately pressure on the hand lever is relaxed for the return stroke of the hand lever and the rack tends to retract, it is arrested by one of the two pawls positively engaging a tooth of the rack and said rack is thereby held during the return stroke of the hand lever and repeated manipulation thereof is continued until the object has been pushed forward to the extent required or permitted by the length of rack available. If the required extent of movement of the object is greater than the available length of the rack, the jack is removed and again fixed in an advanced position and the operation repeated as is necessary.

The ability of the head to swivel permits of its adjustment to the contour of the face of the object being pushed.

Owing to the rack 23, the rack-accommodating member 21 and the hand lever 28 being swivelably mounted on the foot 11 of the post, it will be seen that where the height of the roof is so low as to prevent effective manipulation of the hand lever 28 said hand lever can be tilted sideways to swivel the rack and the rack-accommodating member through approximately 180° and therefore to a position in which the hand lever can be effectively actuated.

Where conditions so dictate, the post of the jack can be wedged between two walls instead of the roof and ground and the rack operated as before described.

What I claim and desire to secure by Letters Patent is:

1. A jack device comprising a post adapted to be wedged at its opposite ends against opposing surfaces, an upper section of the post being telescopically extendible and joined to a lower and non-extendible section, said non-extendible section being divided transversely of its axis into two parts detachably connected together and the meeting ends of the said two parts forming a bearing having its axis normal to the common axis of the said two parts, a rack-accommodating and supporting member disposed rearwardly of the post, a forwardly extending hollow stub shaft fixedly carried by said rack-accommodating and supporting member and journalled in the bearing, a rack extending through said member and said stub shaft and being slidable therein axially of said bearing, a hand lever operably engageable with the rack, a fulcrum on the lever about which said lever operates, link means pivotally connected to said fulcrum and to the rack-accommodating and supporting member, ratchet means in said member for releasable engagement with the rack, a pusher head connected by a universal joint to the forward end of the rack, and means on the post for locking telescoping members of the telescopic section of said post against relative movement under endwise thrust upon the post.

2. A jack device comprising a post adapted to be wedged at its opposite ends against opposing surfaces, said post having a telescopically extendible upper section pivotally connected to a non-extendible lower section forming the foot of the post, said foot being divided transversely of its vertical axis into two upper and lower parts detachably connected together, the meeting ends of the said two parts forming a bearing having its axis normal to said vertical axis, the upper one of the two parts having the pivotal connection with the extendible upper section of the post, a rack-accommodating and supporting member disposed rearwardly of the post a forwardly extending hollow stub shaft fixedly carried by said rack-accommodating and supporting member and journalled in the bearing, a rack extending forwardly through said member and said stub shaft and being slidable therein axially of said bearing, a hand lever operably engageable with the rack, a fulcrum on the lever about which the lever operates, link means pivotally connected to said fulcrum and to the rack-accommodating and supporting member, ratchet means in said member for releasable engagement with the rack, a pusher head connected by a universal joint to the forward end of the rack, and means on the post for locking telescoping members of the telescopic section of said post against relative movement under endwise thrust upon the post.

3. A jack device comprising a post adapted to be wedged at its opposite ends against opposing surfaces, an outer tubular upper limb telescoped by an inner solid cylindrical limb which together form an upper extendible section of the post, a foot forming a lower section of the post, said foot being composed of an upper and a lower part detachably secured together to provide a bearing at their meeting faces, said bearing having its axis disposed normal to the vertical axis of the foot and said upper part of the foot having pivotal connection with the lower end of the tubular upper limb, a pin extending laterally through said tubular limb and supporting the inner limb at the lower end thereof, a rack-accommodating and supporting member disposed rearwardly of the post, a forwardly extending hollow stub shaft fixedly carried by said rack-accommodating and supporting member and journalled in the bearing, a rack extending forwardly through said member and said stub shaft and being slidable therein axially of said bearing, a hand lever operably engageable with the rack, a fulcrum on the lever about which the lever operates, link means pivotally connected to said fulcrum and to the rack-accommodating and supporting member, ratchet means in said member for releasable engagement with the rack, and a pusher head connected by a universal joint to the forward end of the rack.

4. A jack device comprising a post adapted to be wedged at its opposite ends against opposing surfaces, an outer tubular upper limb telescoped by an inner solid cylindrical limb which together form an upper extendible section of the post, a foot forming a lower section of the post, said foot being composed of an upper and a lower part detachably secured together to provide a bearing at their meeting faces, said bearing having its axis disposed normal to the vertical axis of the foot and said upper part of the foot having pivotal connection with the lower end of the tubular upper limb, a pin extending laterally through said tubular limb and supporting the inner limb at the lower end thereof, a rack-accommodating and supporting member disposed rearwardly of the post, a forwardly extending hollow stub shaft fixedly carried by said rack-accommodating and supporting member and journalled in the bearing, a toothed rack extending through said member and said stub shaft and being slidable therein axially of said bearing, a hand lever operably engageable with the rack, a fulcrum on the lever about which the lever operates, link means pivotally connected to said fulcrum and to the rack-accommodating and supporting member, a pair of rack-engaging pawls in the rack-accommodating and supporting member engageable with teeth on the rack, said pawls being spaced a distance apart less than the pitch of the rack teeth, means on the rack-accommodating member carrying the pawls, said means being manipulable for withdrawing and retaining said pawls from operative engagement with the rack, and a pusher head connected by a universal joint to the forward end of the rack.

5. A jack device as claimed in claim 4, in which the pawl-carrying means comprises a carrier plate to which the pawls are secured dependingly, a spindle passing centrally and slidably and rotatably through the plate and into a guide in the upper wall of the rack-accommodating and supporting member, a latch fixedly on the spindle at the underside of the carrier plate adapted to seat in a complementary opening in said upper wall when the pawls are in positive engagement with the rack and to bridge said opening and retain the pawls out of engagement with the rack.

6. A jack device as claimed in claim 3, in which means is provided for preventing complete withdrawal of the inner limb from the outer tubular member, said means comprising a longitudinal groove in said inner limb and a stud in the outer tubular limb, the end of the stud engaging said groove and the lower end of said groove having a shoulder for contact by said stud.

7. A jack device as claimed in claim 4, in which means is provided for preventing complete withdrawal of the inner limb from the outer tubular member, said means comprising a longitudinal groove in said inner limb and a stud in the outer tubular limb, the end of the stud engaging said groove and the lower end of said groove having a shoulder for contact by said stud.

References Cited in the file of this patent
UNITED STATES PATENTS

| | | |
|---|---|---|
| 56,111 | Smith | July 3, 1866 |
| 503,437 | Pilcher | Aug. 15, 1893 |
| 826,124 | Soseman | July 17, 1906 |
| 1,439,677 | Holmes | Dec. 19, 1922 |
| 1,741,134 | Officer | Dec. 24, 1929 |
| 1,835,515 | O'Bryan | Dec. 8, 1931 |
| 1,883,767 | Crewe | Oct. 18, 1932 |
| 2,668,690 | Cameron | Feb. 9, 1954 |
| 2,675,256 | Cornell | Apr. 13, 1954 |